US007209115B2

(12) United States Patent
Shibazaki

(10) Patent No.: US 7,209,115 B2
(45) Date of Patent: Apr. 24, 2007

(54) FORCE-FEEDBACK INPUT DEVICE TO COMPENSATE OUTPUT TO ACTUATOR AND APPLY FIXED FORCE-FEEDBACK IN RESPONSE TO MOVEMENT OF OPERATING SECTION

(75) Inventor: Ken Shibazaki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 414 days.

(21) Appl. No.: 10/271,204

(22) Filed: Oct. 15, 2002

(65) Prior Publication Data

US 2003/0076294 A1 Apr. 24, 2003

(30) Foreign Application Priority Data

Oct. 18, 2001 (JP) ............................ 2001-320344

(51) Int. Cl.
*G09G 5/00* (2006.01)
*G06F 3/00* (2006.01)

(52) U.S. Cl. ...................................... 345/156; 715/703

(58) Field of Classification Search ........ 345/156–168, 345/184; 715/700–703; 341/20; 700/44–47
See application file for complete search history.

(56) References Cited

U.S. PATENT DOCUMENTS 5,264,768 A 11/1993 Gregory et al.
5,734,373 A * 3/1998 Rosenberg et al. ......... 345/161
5,825,308 A * 10/1998 Rosenberg ................... 341/20
6,057,828 A * 5/2000 Rosenberg et al. ......... 345/156
6,067,077 A * 5/2000 Martin et al. ............... 345/161
6,636,197 B1 * 10/2003 Goldenberg et al. ........ 345/156

FOREIGN PATENT DOCUMENTS

GB 2 350 698 12/2000

OTHER PUBLICATIONS

Search Report dated Dec. 28, 2004 for European Patent Application No. 02 02 3290.

* cited by examiner

*Primary Examiner*—Richard Hjerpe
*Assistant Examiner*—Duc Q Dinh
(74) *Attorney, Agent, or Firm*—Brinks Hofer Gilson & Lione

(57) ABSTRACT

A force-feedback input device comprising an operating section, actuators to supply force-feedback by way of a transmission mechanism to the operating section, a movement quantity detector to detect a quantity of movement of the actuators and a controller to control the actuators by an output from the movement quantity detector. An initializing process is performed by the controller at startup utilizing an output from the movement quantity detector, and an output to the actuators is compensated after startup so that a fixed quantity of force-feedback is supplied to a quantity of movement of the operating section.

9 Claims, 6 Drawing Sheets

FORCE-FEEDBACK INPUT DEVICE TO COMPENSATE OUTPUT TO ACTUATOR AND APPLY FIXED FORCE-FEEDBACK IN RESPONSE TO MOVEMENT OF OPERATING SECTION

This application claims the benefit of priority to Japanese Patent Application No. 2001-320344 filed on Oct. 18, 2001.

BACKGROUND OF THE INVENTION

1. Field of the Invention

The present invention relates to an input device to concentrate the operation of a plurality of electronic devices into one operating section and relates in particular to a force-feedback input device for feeding vibration back to the operating section.

2. Description of Related Art

In recent years automobiles have been provided with different types of electronic devices such as air conditioners, radios, television, CD players, and navigation systems. However operating the vehicle may become difficult while attempting to separately operate each of these electronic devices. To make actions such as turning the desired electronic equipment on and off and selecting functions simple without interfering with driving the vehicle, force-feedback devices of the related art were proposed so that by operating one operating element, a vibration unique to a specified operating position was fed back to the user.

A force-feedback device of this type in the related art is explained while referring to the drawings. FIG. 5 is a perspective view of the mechanism of the force-feedback device of the related art. FIG. 6 is a block diagram of the force-feedback device of the related art. FIG. 7 is a drawing illustrating the intermeshing of the gears.

An operating section 11 is connected to a shaft 12 and a bearing 13. The operating section 11 is capable of oscillating by way of the bearing 13. The bearing 13 is clamped to the case 14.

Two linkages 15, 16 are made of metal formed in an L shape. These linkages 15, 16 are installed at right angles to each other and have slotted holes 15*a*, 16*a* at one end. A shaft 12 is inserted through these slotted holes 15*a*, 16*a*. The linkages 15, 16 are moved by the oscillation of the shaft 12.

Two large gears 17, 18 are axially supported in mutually intersecting directions in a case 14. The large gears 17, 18 are fastened at the end opposite the end of the linkages 15, 16 having the slotted holes, and the linkages 15, 16 rotate as one piece along with the large gears 17, 18. The oscillation of the operating section 11 respectively rotates the large gears 17, 18 by way of the linkages 15, 16 according to the oscillating direction of the operating section 11.

The small gears 19, 20 intermesh with the large gears 17, 18 and are installed at right angles to each other. The small gears 19, 20 rotate faster (have a greater rotation quantity) than the large gears 17, 18.

The encoders 21, 22 rotate as one piece concentrically with the small gears 19, 20. The encoders 21, 22 output the rotation quantity in a direction at right angles to the small gears 19, 20. For example, the encoder 21 detects the rotation quantity in the X direction and the encoder 22 detects the rotation quantity in the Y direction. These rotation quantities detected in the X direction and Y direction can be substituted into X coordinates and Y coordinates for position information.

The motors 23, 24 rotate concentrically as one piece with the small gears 19, 20 and the encoders 21, 22. Therefore, oscillating the operating section rotates the small gears 19, 20, and the shafts of the encoders 21, 22 and the motors 23, 24 rotate along with this rotation. Conversely, when the motors 23, 24 are rotated minutely in forward or reverse, the operating section 11 oscillates minutely. A unique vibration from this oscillation is fed back to the operating section 11 as force-feedback.

The operation of the operating section 11 is next described while referring to the block diagram of FIG. 6. Oscillation of the operating section 11 rotates the encoders 21, 22 and position information is obtained by way of the X coordinates and Y coordinates. This position information is detected by the position signal detector 25 within the computer 24. The position signal detector 25 sends a table select signal according to this acquired position information to the table selector section 27*a* inside the CPU 27. The table selector section 27*a* using the table select signal, selects a corresponding table from the table 26*a* within the ROM 26 and sends this signal to the motor driver 28. After the collator 27*b* inside the CPU 27 checks whether or not the position information appended to the table is correct, the position information is sent at this time to the motor driver 28. Information conveying the rotational direction and size of the rotational torque of the motors 23, 24 is encoded and stored in the table 26. A drive signal is sent from the driver 28 to the motors 23, 24 and the motors 23, 24 are then driven by this drive signal. The operating section 11 in this way obtains force-feedback from the selected table by the driving of the motors 23, 24.

A problem occurs in this above method using two gears for conveying power from the motor to the operating section, because the extent of intermeshing between the two gears is different due to variations in the part dimensions. FIG. 7 is a concept view showing the gear intermeshing in the force-feedback device of FIG. 5. Here, one set of gears 19, 20 is axially supported by the motor drive shaft 29. The other set of gears 17, 18 is slaved to the other gears and rotates a gear bearing 30. In FIG. 7, when the gear intermesh clearance C is set to 1 millimeter and the inter-axial distance L is set to 30 millimeters as the design specification values, the gear diameter becomes larger due to variations in the gear parts and the gear intermesh clearance becomes 0 millimeters and the inter-axial distance L becomes 31 millimeters. (The inter-axial distance widens as a result of the gears mutually pushing against each other due to a larger gear diameter caused by variations in part dimensions.) In such cases, even if a fixed quantity of electrical current is made to flow in the motor, the gear intermesh was too tight so that the quantity of gear movement (rotation quantity) became smaller with respect to the fixed amount of electrical current. Conversely, when the gear diameter became smaller due to parts variations, and the inter-axial distance L became 30 millimeters and the clearance C became 1.5 millimeters, the quantity of gear movement (rotation quantity) became larger with respect to the fixed amount of electrical current.

Therefore, even if force-feedback input devices were made having transmission devices of the same structure, the problem occurred that the force-feedback that was fed back to the operating section was different in each product due to variations in parts dimensions in the transmission mechanism.

SUMMARY OF THE INVENTION

In view of the above problems, the present invention has the object of providing a force-feedback input device that applies a fixed quantity of force-feedback to the operating section, even if there are variations in parts dimensions in the transmission mechanism.

The force-feedback input device of the present invention contains an operating section, actuators to supply force-feedback by way of a transmission mechanism to the operating section, movement quantity detectors to detect a quantity of movement of the actuators, and a controller to control the actuators by way of the output from the movement quantity detectors. At startup or when a designated event occurs, an initializing process is performed by the controller utilizing an output from the movement quantity detectors, and an output to the actuators is compensated after startup or when the designated event has occurred so that a fixed quantity of force-feedback is supplied to a quantity of movement of the operating section. This structure therefore performs an initializing process and compensation by utilizing the output from the movement detectors so that a fixed quantity of force-feedback is applied to the operating section even if variations exist in the parts dimensions in the transmission mechanism.

Further, the initializing process applies a specified output to the actuator at startup or when a designated event occurs, detects the actuator movement quantity from the detectors, calculates a value in the processor of the controller by making a comparison based on an ideal movement quantity, and after startup or after the designated event has occurred, utilizes the calculated value to compensate the output of the actuator.

This structure therefore finds a compensation coefficient by comparing the actuator movement quantity with an ideal movement quantity and then performs compensation so that a fixed quantity of force-feedback is applied to the operating section even if variations exist in the parts dimensions in the transmission mechanism.

Still further, an electrical current detector is installed for detecting an electrical current of the actuator, a specified output is applied to a motor at startup or when a designated event occurs, an electrical current value of the actuator is detected from the electrical current detector, a value is calculated in the processor by making a comparison based on an ideal current value, and after startup or after the designated event has occurred, the calculated value is utilized to compensate an output to the motor.

This structure therefore finds a compensation coefficient by comparing the actuator movement quantity with an ideal movement quantity and then performs compensation so that a fixed quantity of force-feedback is applied to the operating section even if variations exist in the parts dimensions in the transmission mechanism. An even more precise compensation coefficient is obtained by combining a calculation comparing the electrical current measurement with an ideal electrical value, with a calculation comparing the movement quantity with an ideal movement quantity.

DETAILED DESCRIPTION OF THE PREFERRED EMBODIMENT

Figure 1:
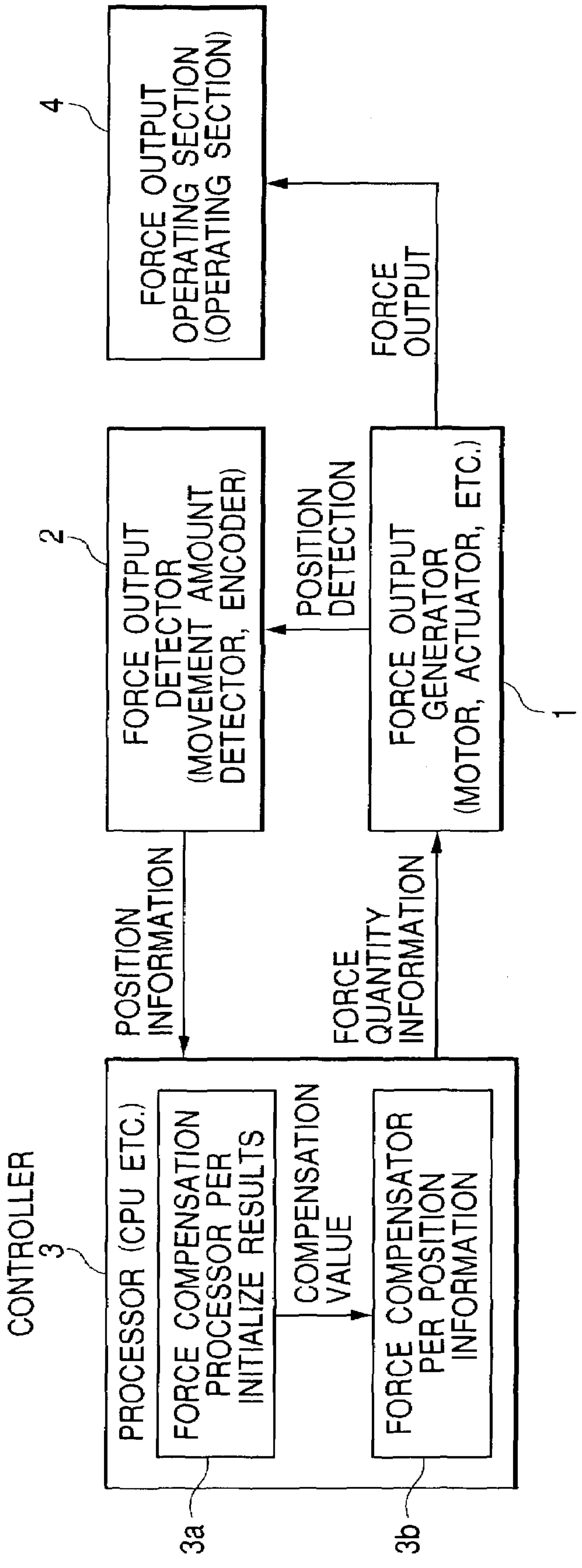
FIG. 1 is a block diagram of the initializing process for the force-feedback input device of the first embodiment of the invention.
Figure 2:
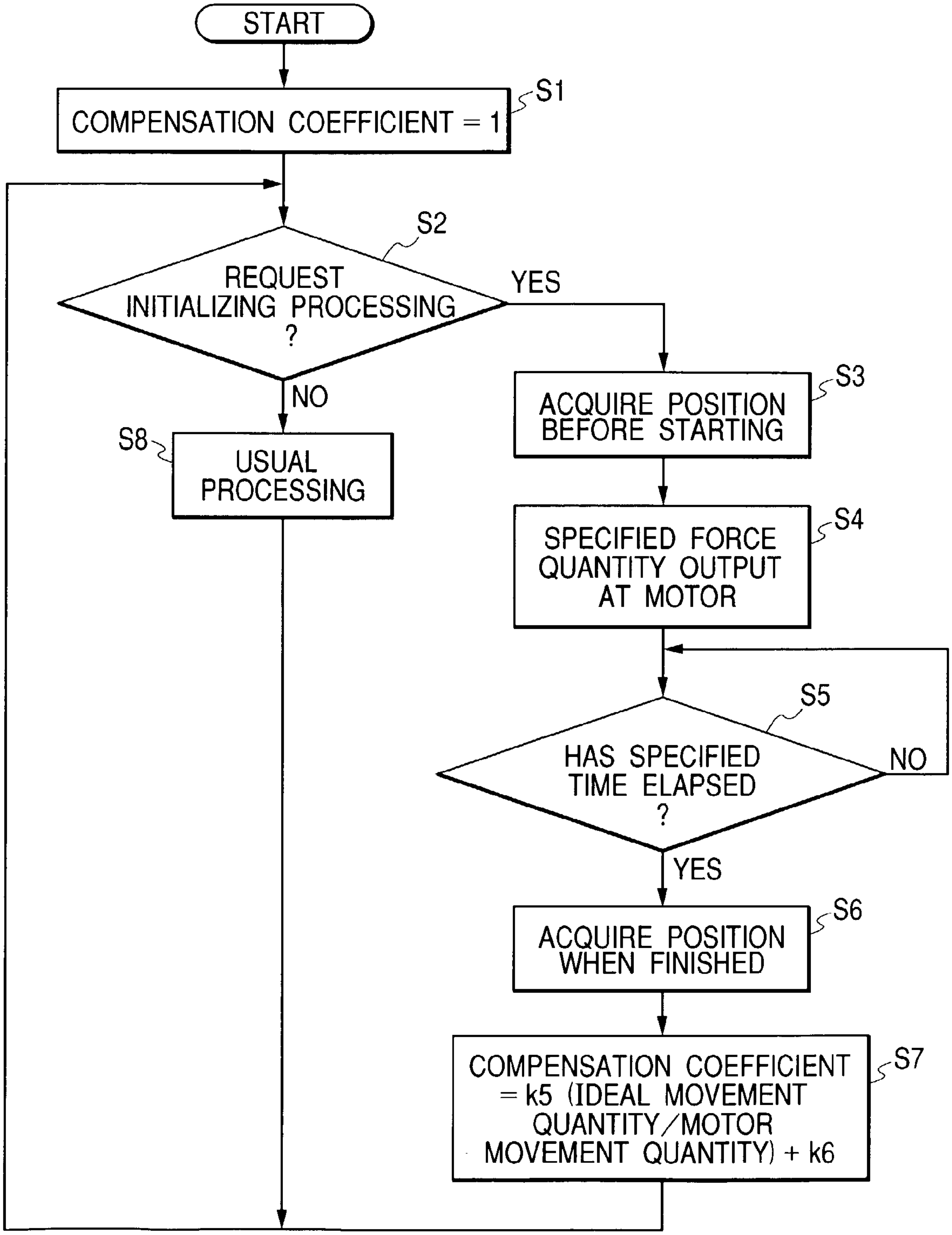
FIG. 2 is a flowchart of the initializing process for the force-feedback input device of the first embodiment of the invention.
Figure 5:
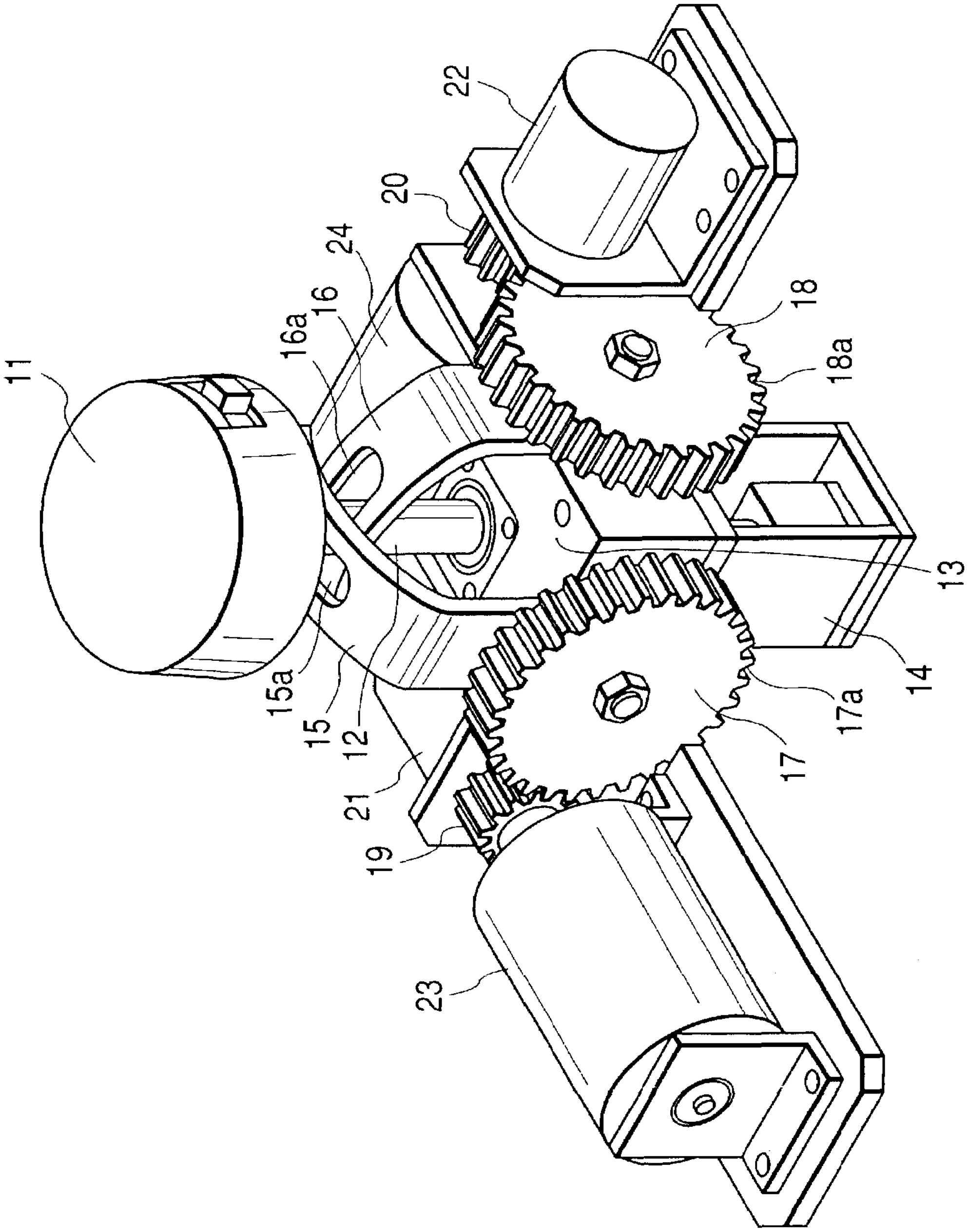
FIG. 5 PRIOR ART
FIG. 5 is a perspective view of the mechanism of the force-feedback input device of the related art.
Figure 6:
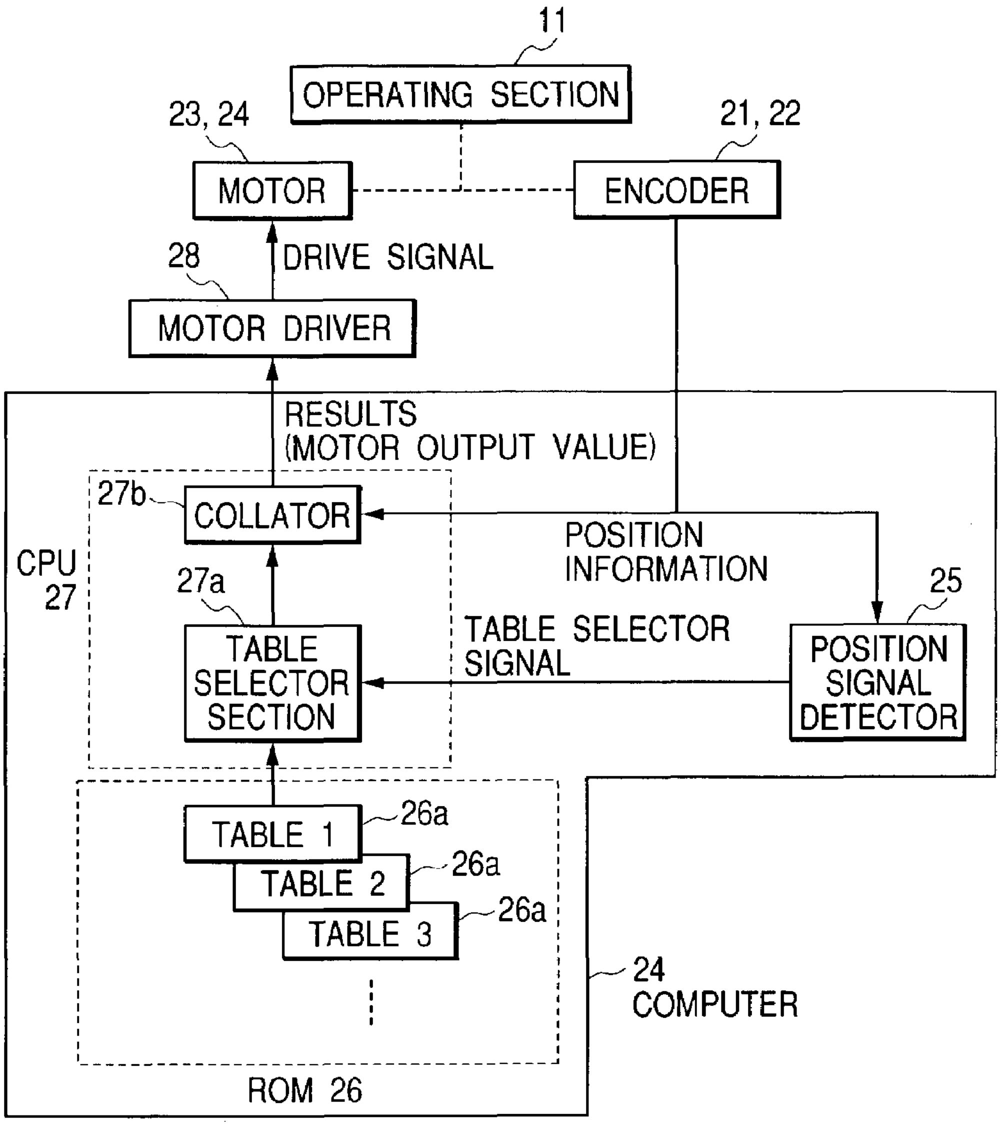
FIG. 6 PRIOR ART
FIG. 6 is a block diagram showing the operation of the force-feedback input device of the related art.
Figure 7:
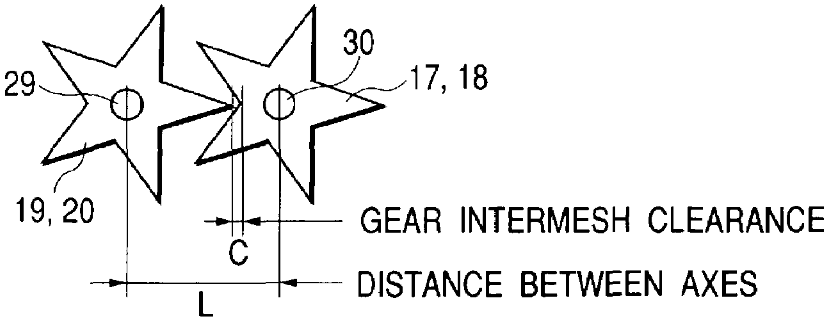
FIG. 7 PRIOR ART
FIG. 7 is a drawing illustrating the intermeshing of the gears of the related art.

The first embodiment of the present invention is described next based on the drawings. Here, FIG. 1 is a block diagram of the initializing process for the force-feedback input device of the first embodiment of the invention. FIG. 2 is a flowchart of the initializing process for the force-feedback input device of the first embodiment of the invention. The mechanical structure of the embodiment is the same as the above-described force-feedback input device of the related art so the embodiment is described while using FIG. 5 unchanged.

In the present invention an initializing process by the controller utilizes the output from movement detectors during startup to compensate the actuator output after startup to apply a fixed quantity of force-feedback to the movement quantity of the operating section.

As shown in the block diagram of FIG. 1, the force output generator 1 consists of an actuator, specifically the motors 23, 24. During the initializing process, a specified output (electrical current value) is applied to the motors 23, 24 at startup or when a designated event occurs. Here, a designated event signifies an initializing request from another control device by communication not shown in the drawings or an initializing request performed by depressing an initializing switch not shown in the drawings.

A force output detector (movement quantity detector) 2 monitors the operation of the motors 23, 24 of the force output generator 1 and when a specified output is applied, detects the movement quantity of the motors 23, 24. In the case of the present embodiment, the movement quantity of the gears 19, 20 directly linked to the motors 23, 24 as the transmission mechanism is detected by the encoders 21, 22.

A controller 3 contains a processor comprised of a CPU, etc. The processor contains a force compensation processor 3*a* utilizing initializing results and a force compensator 3*b* utilizing position information. The controller 3 acquires position information from the movement quantity detector 2, calculates a compensation value in the force compensation processor 3*a* from the initializing results, and using position information based on this compensation value, compensates the force compensator 3*b*.

The force output generator 1 receives the corrected force quantity information from the controller 3 and outputs the force output.

A force output operating section 4 or more specifically an operating section 11 receives the force output from the force output generator 1 and a fixed quantity of force-feedback is applied to the operating section 11.

The operation of the force-feedback input device of the first embodiment of the present invention is described next utilizing the initializing process flowchart in FIG. 2. After startup, the compensation coefficient for calculating the compensation value is set to 1 in step 1 (Here step 1 is related as S1. Step 2 is related as S2 and other steps related in the same way hereafter.). In S2 a decision is made whether there is a request for initializing or not. If decided to request initializing (YES), then position data prior to starting is acquired by the encoder in S3. Next, in S4, a specified force quantity (electrical current value) is output to the motors 23, 24. In step S5 the process waits for a specified amount of time to elapse. After the specified amount of time has elapsed, the position data is acquired by the encoder in S6.

Next, by utilizing the ideal movement quantity (ideal movement quantity=design specification value) when the specified quantity has been output for the specified time, the compensation coefficient formula, k5 (ideal movement quantity/motor movement quantity)+k6 is calculated in S7 using position data prior to starting and position data after completion. When finished calculating the compensation coefficient, the process returns to prior to S2. In S2 whether or not to request the initializing processing is decided. Here, however, the initializing process is already finished so a (NO) is decided and there will be no initializing until the next initializing request is output. In S8, the usual processing is performed based on the compensation coefficient calculated in the previous step, and a compensation value is output to the force output operating section 4 (operating section) by the force output generator 1. The constants k5 and k6 in the formula described above for the compensation coefficient are constants for the transmission mechanism and set as needed according to the transmission mechanism. The intermeshing of gears was described for the transmission device of the present embodiment. However, when the diameter of the gears changes or the transmission device changes due to other items, then the constants k5, k6 will change.

Figure 3:
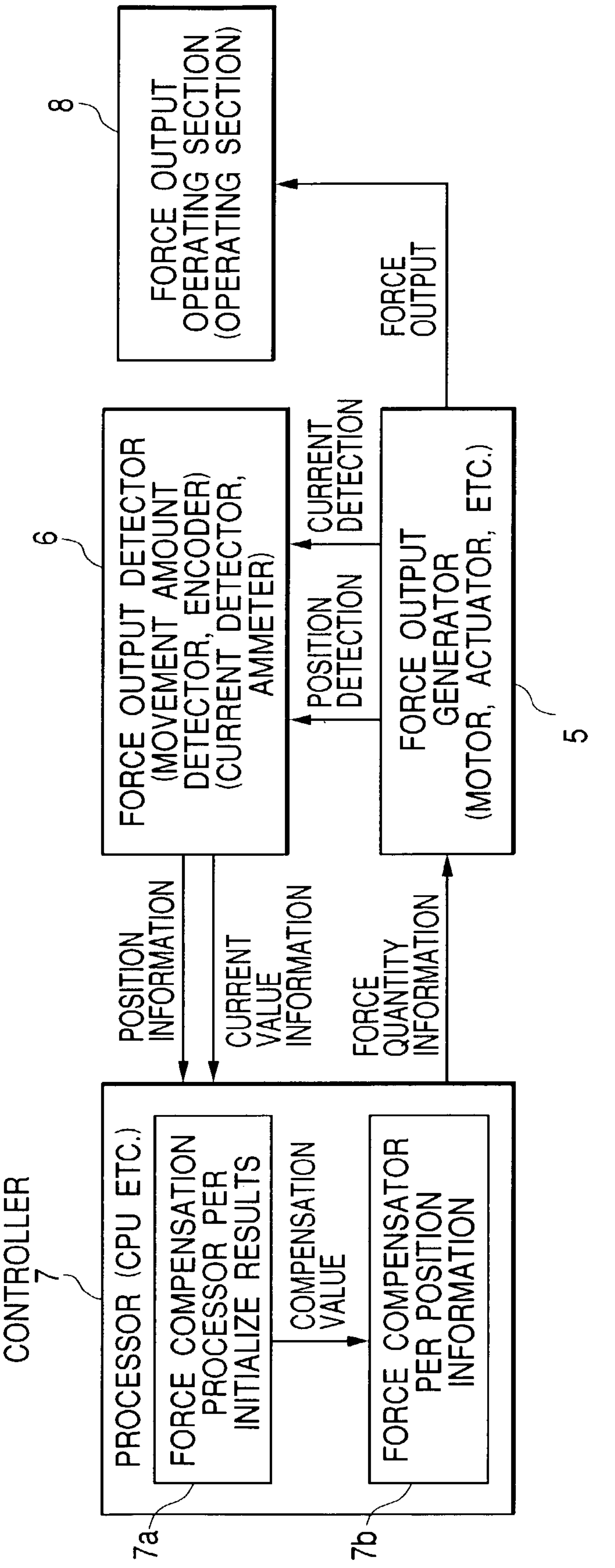
FIG. 3 is a block diagram of the initializing process for the force-feedback input device of the second embodiment of the present invention.
Figure 4:
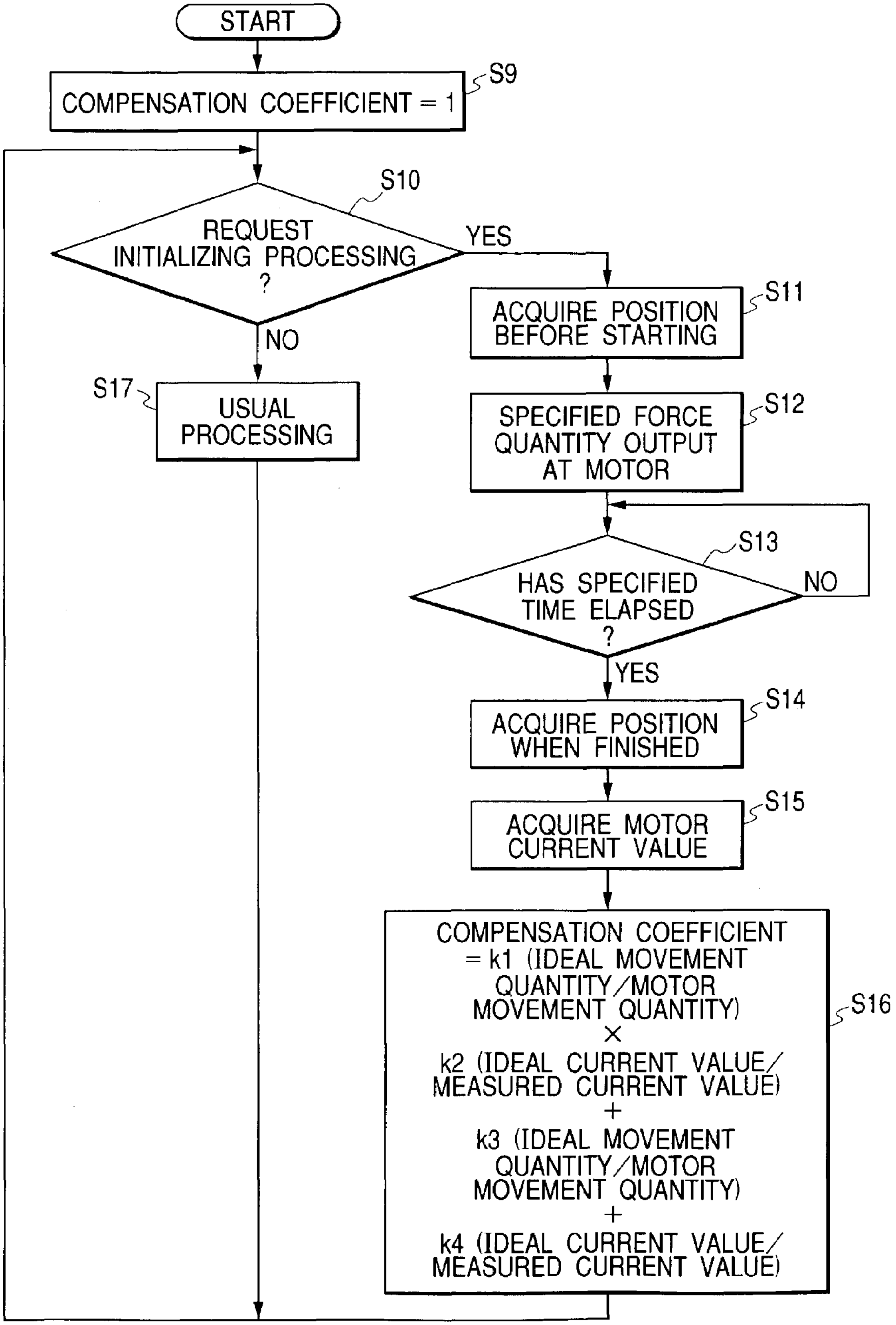
FIG. 4 is a flowchart of the initializing process for the force-feedback input device of the second embodiment of the present invention.

The second embodiment of the initializing process of the present invention is described next. FIG. 3 is a block diagram of the initializing process in the force-feedback input device of the second embodiment of the present invention. FIG. 4 is a flowchart of the initializing process for the force-feedback input device of the second embodiment of the present invention. Also, the mechanical structure of the embodiment is the same as the above-described force-feedback input device of the related art so the embodiment is described while using FIG. 5 unchanged.

A force output generator 5 as shown in the block diagram of the initializing process in FIG. 1 consists of an actuator, more specifically the motors 23, 24. During the initializing process, a specified output (electrical current value) is applied to the motors 23, 24 at startup or when a designated event occurs.

A force output detector (movement quantity detector, electrical current detector) 6 monitors the motor 23, 24 operation at the force output generator 5 and when a specified output is applied, detects the movement quantity of the motors 23, 24 by the encoders 21, 22, and also detects the value of electrical current flowing in the motors 23, 24 when the specified output has been applied. In the case of the present embodiment, the movement quantity of the gears 19, 20 directly linked to the motors 23, 24 as the transmission mechanism is detected by the encoders 21, 22.

A controller 7 contains a processor comprised of a CPU, etc. The processor contains a force compensation processor 7*a* utilizing initializing results and also a force compensator 7*b* utilizing position information. The controller 7 acquires position information and electrical current value information from the movement quantity detector and electrical current detector sections of the force output detectors (movement quantity detector, electrical current detector) 6, calculates a compensation value in force compensation processor 7*a* from the initializing results, and using position information based on this compensation value, compensates the force compensator 7*b*.

The force output generator 5 receives the corrected force quantity information from the controller 7 and outputs the force output.

A force output operating section 8 or more specifically the operating section 11 receives the force output from the force output generator 5 and a fixed quantity of force-feedback is applied to the operating section 11.

The initializing process of the force-feedback input device of the second embodiment of the present invention is described next while referring to initializing process flowchart in FIG. 4. An ammeter not shown in the drawings is installed in the force-feedback input device of FIG. 5. After startup, the compensation coefficient for calculating the compensation value is set to 1 in step 9 (Here step 9 is related as S9. Step 10 is related as S10 and other steps related in the same way hereafter.). In S10 a decision is made whether or not to request initializing. If decided to request initializing (YES), then position data prior to starting is acquired by the encoder in S11. Next, in S12, a specified force quantity (electrical current value) is output to the motors 23, 24. In step S13 the process waits for a specified amount of time to elapse. After the specified amount of time has elapsed, in S14 the position data is acquired by the encoder. Next, the electrical current value is acquired by the ammeter in S15.

Next, by utilizing the ideal movement quantity (ideal movement quantity=design specification value) when the specified quantity has been output for the specified time, and the electrical current value when the specified force quantity is output (ideal electrical value=design specification value), the compensation coefficient formula of k1 (ideal movement quantity/motor movement quantity)×k2 (ideal electrical value/measured electrical value)+k3 (ideal movement quantity/motor movement quantity)+k4 (ideal electrical value/measured electrical value) is calculated in S16 using position data prior to starting and position data after completion. When finished calculating the compensation coefficient, the process returns to prior to S10. In S10 whether or not to request the initializing processing is decided. Here, however, the initializing process is finished so a (NO) is decided and no initializing is requested until the next request is output. In S17, the usual processing is performed based on the compensation coefficient calculated in the previous step. In the case of the present embodiment, besides comparing the ideal movement quantity with the motor movement quantity, the compensation coefficient is calculated by also comparing the ideal electrical current value with the measured electrical current value so that a more accurate compensation coefficient can be calculated compared to when only comparing the ideal movement quantity with motor movement quantity.

The constants k1, k2, k3, k4 in the formula described above for the compensation coefficient are constants for the transmission mechanism and are set as needed according to the transmission mechanism. The intermeshing of gears was described for the transmission device of the present embodiment. However, when the diameter of the gears changes or the transmission device changes due to other items, then the constants k1, k2, k3, k4 will change.

In the above embodiments, an example described using a motor (rotating motor) as an actuator. However, the present invention is not limited to the aforementioned example and other actuators such as solenoids and direct-action voice coil motors may also be utilized.

Also the example in the above embodiments described utilizes an encoder as the movement quantity detection means. However, the present invention is not limited to the aforementioned example and other potentiometers and magnetic converter elements may also be utilized as the movement quantity detection means.

The force-feedback device of the present invention as described above is comprised of an operating section, actuators to supply force-feedback by way of a transmission mechanism to the operating section, movement quantity detectors to detect the quantity of movement of the actuators, and a controller to control the actuators by way of the output from the movement quantity detectors. An initializing process is performed by the controller at startup utilizing the output from the movement quantity detector, and the output to the actuator is compensated after startup so that a fixed force-feedback is supplied for the movement quantity of the operating section.

By performing an initializing process and performing compensation by utilizing the output from the movement detectors, this structure applies a fixed quantity of force-feedback to the operating section even if variations exist in the parts dimensions of the transmission mechanism.

What is claimed is:

1. A force-feedback input device comprising:

an operating section, an actuator to supply force-feedback by way of a transmission mechanism to the operating section, movement quantity detectors to detect a quantity of movement of the actuator, and a controller to calculate force quantity and control the actuator by way of an output from the movement quantity detectors, wherein the controller calculates a force compensation coefficient by making a comparison based on detected movement quantity when a specified force quantity has been output for a specified time and ideal movement quantity when the specified force quantity has been output for the specified time, and the controller compensates the force quantity based on the calculated force compensation coefficient.

2. A force-feedback input device comprising:

an operating section, an actuator to supply force-feedback by way of a transmission mechanism to the operating section, movement quantity detectors to detect a quantity of movement of the actuator, an electrical current detector to detect an electrical current of the actuator, and a controller to calculate force quantity and control the actuator by way of an output from the movement quantity detectors, wherein the controller calculates a force compensation coefficient by making a comparison based on a detected electrical current value when a specified force quantity has been output for a specified time and an ideal electrical current value when the specified force quantity has been output for the specified time, and the controller compensates the force quantity based on the calculated force compensation coefficient.

3. A force-feedback input device comprising:

an operating section, an actuator that is coupled to and operative to supply a force-feedback to the operating section, movement quantity detectors that are operative to detect movement of the actuator, and a controller that is operative to calculate a force compensation coefficient and provide a fixed force quantity of force-feedback to the operating section based on the force compensation coefficient, wherein the force compensation coefficient is a value that represents the difference between a design specification movement value and a calculated specification value, and wherein the calculated specification value is the detected movement quantity of the actuator when a predetermined force quantity has been output for a predetermined time.

4. The force-feedback input device according to claim 3, wherein the force compensation coefficient is the difference between the actual position of the actuator after a predetermined force quantity is applied to the actuators and the theoretical position of the actuators based on design parameters.

5. The force-feedback input device according to claim 4, wherein the theoretical position of the actuators is the position value of the actuators after the predetermined time and predetermined force is applied.

6. The force-feedback input device according to claim 3, wherein the actuator comprises gears, the position of the gears being determined by encoders; and the actual position and the calculated specification value is determined by the position of the gears.

7. The force-feedback input device according to claim 1, wherein the force quantity is a torque.

8. The force-feedback input device according to claim 1, wherein the detected movement quantity is a position of the actuators and the ideal movement quantity is the position value of the actuators had the actuators operated as originally designed under the specified force and time.

9. The force-feedback input device according to claim 2, wherein the force quantity is a torque.

* * * * *